United States Patent [19]

Edvardsson

[11] Patent Number: 5,136,299
[45] Date of Patent: Aug. 4, 1992

[54] DEVICE AT A RADAR LEVEL GAUGE

[75] Inventor: Kurt O. Edvardsson, Linköping, Sweden

[73] Assignee: Saab Marine Electronics Aktiebolag, Sweden

[21] Appl. No.: 687,914

[22] PCT Filed: Jan. 11, 1990

[86] PCT No.: PCT/SE90/00019
§ 371 Date: Jun. 6, 1991
§ 102(e) Date: Jun. 6, 1991

[87] PCT Pub. No.: WO90/09599
PCT Pub. Date: Aug. 23, 1990

[30] Foreign Application Priority Data
Feb. 8, 1989 [SE] Sweden ............... 8900424

[51] Int. Cl.5 .................... G01S 13/08; G01F 23/28
[52] U.S. Cl. .................... 342/124; 342/188; 367/908; 73/290 V
[58] Field of Search .............. 342/124, 188; 367/908; 73/290 V

[56] References Cited

U.S. PATENT DOCUMENTS

| | | | |
|---|---|---|---|
| 3,394,589 | 7/1968 | Tomioka | 367/908 |
| 4,170,765 | 10/1979 | Austin et al. | 387/908 X |
| 4,641,139 | 2/1987 | Edvardsson | 342/124 |
| 5,070,730 | 12/1991 | Edvardsson | 342/124 X |

*Primary Examiner*—Gilberto Barron, Jr.
*Attorney, Agent, or Firm*—Lowe, Price, LeBlanc & Becker

[57] ABSTRACT

A device for gauging the level of a fluid in a container with a microwave signal is described. The device comprises a vertical tube (1) mounted in the container, and a transmitter and a receiver and an electronic unit for determining the level based on the reflex position of the microwave signal. The device is characterized particularly by a calibration device in the form of a polarization means (6, 7) for polarizing the microwave signal in two polarization planes separated from each other and at least one reflecting reactance (10) in the tube (1) arranged to give a substantially stronger reflex of the microwave signal in the first polarization plane than in the second.

7 Claims, 4 Drawing Sheets

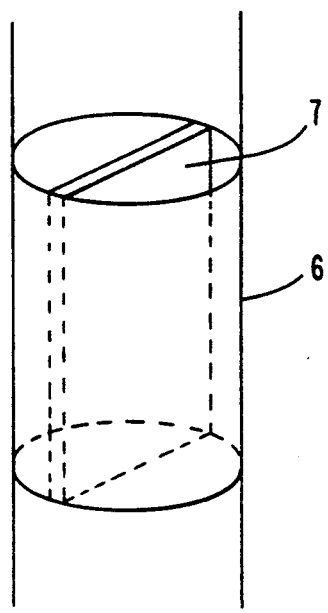
Fig. 2A
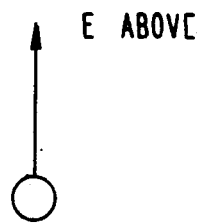
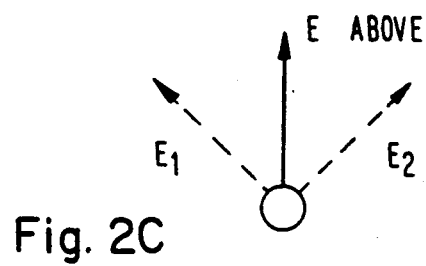
Fig. 2B  Fig. 2C
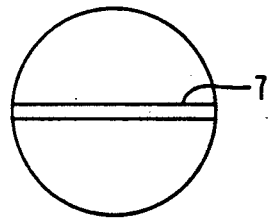
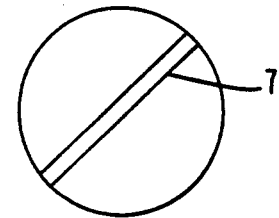
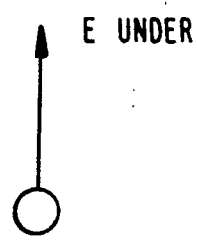
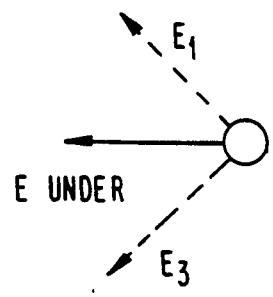

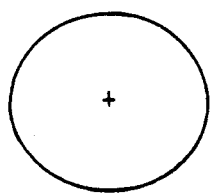
Fig. 3A₁
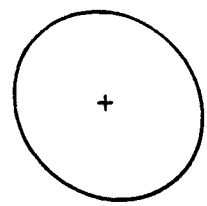
Fig. 3A₂
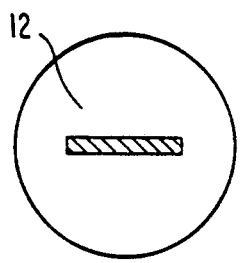
Fig. 3B₁
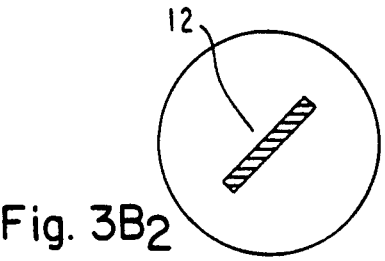
Fig. 3B₂
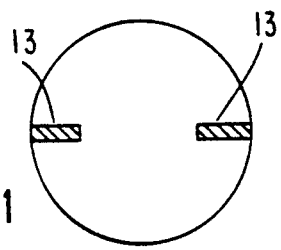
Fig. 3C₁
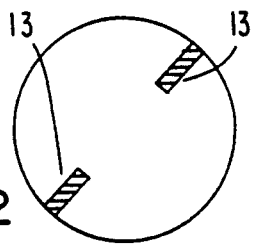
Fig. 3C₂
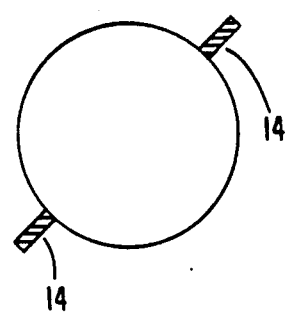
Fig. 3D₁
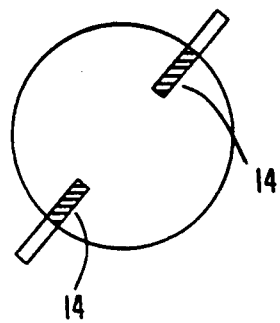
Fig. 3D₂

DEVICE AT A RADAR LEVEL GAUGE

The present invention relates to a device for gauging the level of a fluid in a container, i.e. a fluent for granulate material, preferably a condensable gas under overpressure, comprising a vertical tube through which a number of relatively small openings in its wall so communicate with said fluid that its level is the same in the tube as in the container, further a transmitter for feeding a polarizable microwave signal through the said tube, its cross section being so big that it admits passage of the microwave signal, further a receive of reflected microwave signal and an electronic unit arranged to determine the reflex position of the reflected microwave signal.

Such devices have become more and more important particularly for petroleum products such as crude oil and products manufactured therefrom. By containers it is meant in this context large containers constituting parts of the total loading volume of a tanker, or even larger usually circular-cylindrical landbased tanks with volumes of tens or thousands of cubic meters. Demands on accuracy of measurement have become higher. This has brought about, for instance, that level gauging in containers that contain condensable gas under overpressure, such as natural gas, butane or propane, places particularly high demands on the gauging equipment used. When ordinary petroleum products are used, i.e. such that are fluent at the usual temperatures, it is possible to open the container even when it is filled to a greater or less degree with the product in question, and through this a calibration of the gauge can be effected without too much work.

When to gauge the level in a container that contains condensable gas under overpressure it is possible only exceptionally to open such a container and make a calibration. In addition, because the velocity of propagation of the microwave signal depends on the pressure in the gas there is a great need for an arrangement for calibrating a device of the kind mentioned in the introduction.

According to the invention a device of the kind mentioned in the introduction, which can be calibrated in a simple manner also when the said container contains a condensable gas under overpressure, is characterized primarily by a polarization means, arranged optionally to polarize the microwave signal emitted from the transmitter in a first and a second polarization plane, which form a mutual angle, preferably 90°, and further by at least one reflecting reactance arranged in the tube to give a substantially stronger reflex of the microwave signal in the first polarization plane than in the second.

The said tube is usually circular-cylindrical, but other embodiments are also possible provided they show 90° symmetry in cross section, such as a square or superelliptical cross section with two equally long major axes. As a polarizable microwave signal, such is preferably used as shows $H_{11}$ mode, but also other rotary unsymmetrical modes, such as $E_{11}$ mode, are conceivable. In practice, the cross section of the tube is often dimensioned so that it admits passage of higher modes. In a preferred embodiment of the device according to the invention the transmitter comprises a circular waveguide for one-mode propagation, primary for $H_{11}$ mode.

The polarization means can in a known manner be formed in many different ways. In a suitable embodiment it consists of a substantially plane plate of a dielectric material such as a polymer, arranged with its plane substantially parallel to the symmetry axis of the waveguide, preferably crosswise filling out the diameter of the waveguide, the waveguide having suitably a circular cross section. The plate is arranged turnable about the symmetry axis of the waveguide between two positions, preferably so that the planes of the plate in the two positions form 45°.

In an alternative preferred embodiment of the polarization means the plate of dielectric material is replaced by one or two plane metal plates, they too being placed with their planes substantially parallel to the symmetry axis of the waveguide, however not crosswise filling out the diameter of the waveguide. The plate or plates are correspondingly turnable.

In another suitable embodiment of the polarization means this is a section of a waveguide, which is oval in cross section, the waveguide section being arranged turnable about its symmetry axis optionally between two positions, preferably so that the longitudinal symmetry planes of the waveguide section in the two positions form 45°.

Also, the said reactance can be formed in a number of different ways. A suitable embodiment comprises that it is formed of a relatively thin metal pin, arranged with its longitudinal direction perpendicular to the longitudinal axis of the tube, preferably extending diametrically through the tube.

The reactance can also be formed by an aperture in the wall of the tube, preferably with its longitudinal direction perpendicular to the longitudinal axis of the tube. The aperture can be made substantially bigger than said relatively small openings in the tube, but this is not necessary—at calibration such an electronic unit can be used that is provided with a suitable filter, so that the reflex position of the reactance can still be measured.

Although it would be sufficient to arrange a single reactance in the tube, it is suitable in practice to arranged several of them. When a reactance is below the surface of the fluid, i.e. the fluid has risen above its position, it does not give any reflex. p The invention will now be described more in detail with reference to the accompanying figures, of which:

FIG. 2A shows schematically in perspective a polarization means;

Figure 4A:
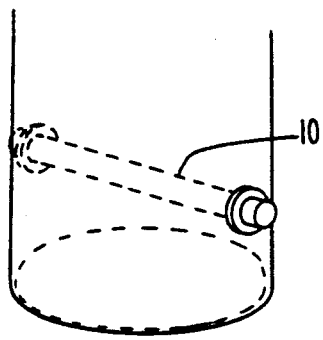
Figure 4B:
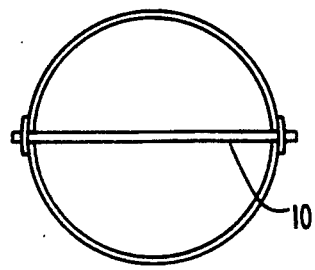
Figure 5A:
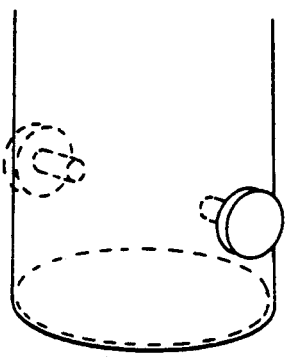
Figure 5B:
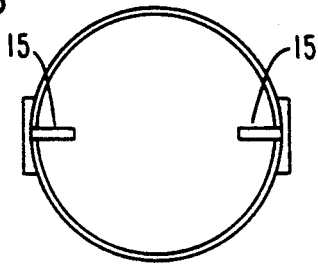
Figure 6A:
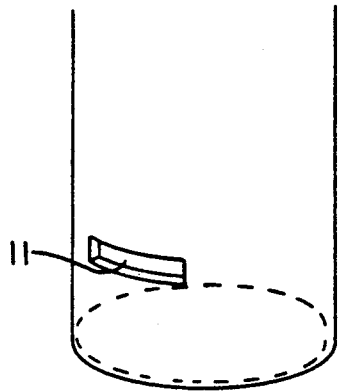
Figure 6B:
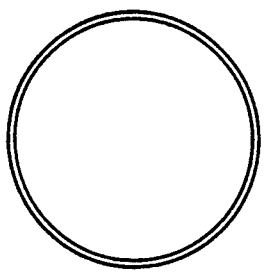

FIG. 2 B, C show the functioning of polarization means according to FIG. 2 A;

FIGS. 3 A-D show schematically in cross section a number of embodiments of the polarization means;

FIGS. 4 A, B show schematically in perspective and cross section, respectively, an embodiment of a reactance according to the invention;

FIGS. 5 A, B show schematically in perspective and cross section, respectively, an alternative embodiment of a reactance, and;

FIGS. 6 A, B show schematically in perspective and cross section, respectively, another alternative embodiment of a reactance.

Figure 1:
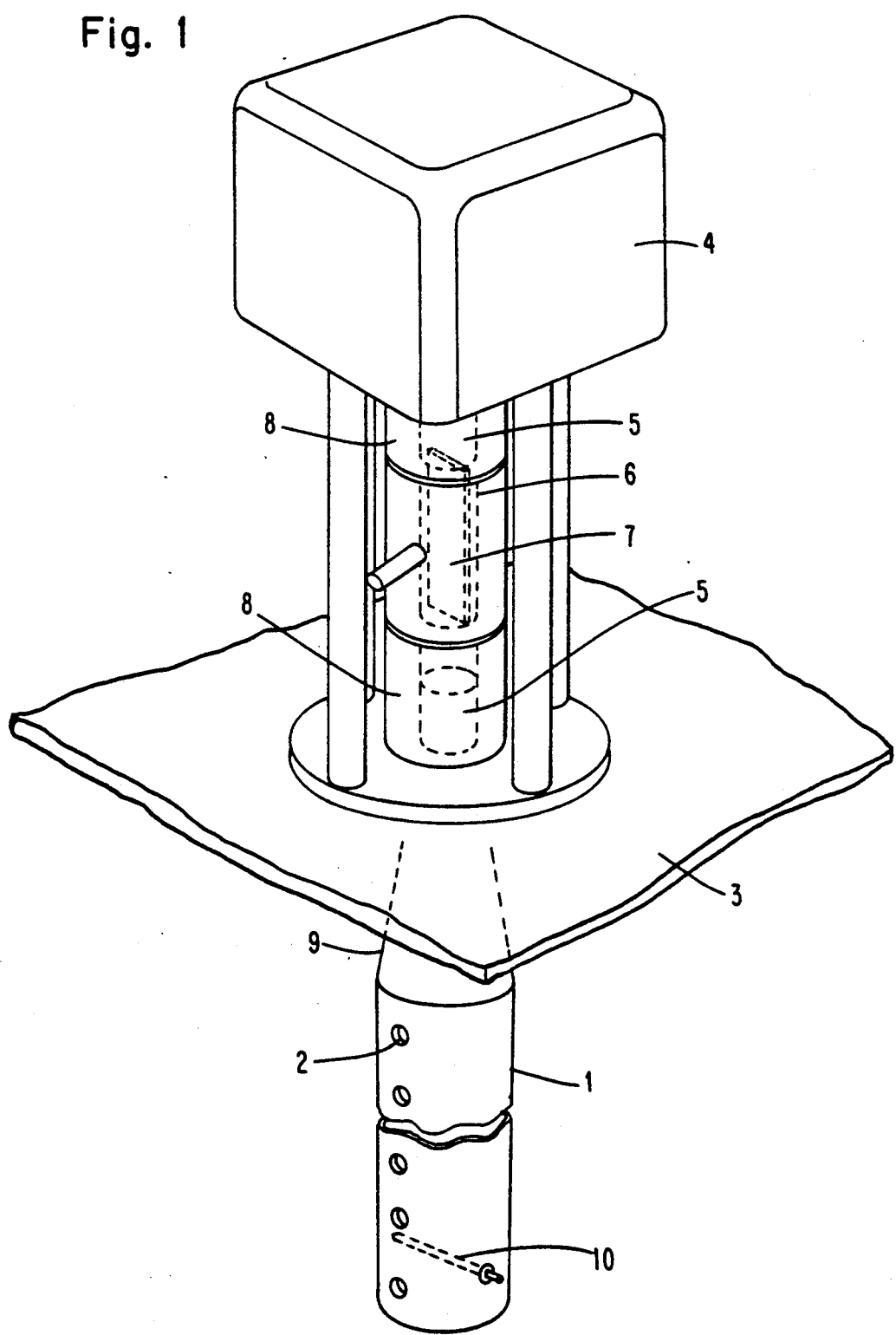
FIG. 1 shows schematically in perspective a device according to the invention.

In FIG. 1, 1 designates a vertical, circular-cylindrical tube that is rigidly mounted in a container, not shown, containing a fluid, such as a condensed gas. The tube is not shown in its entire length but only in its upper and lower portions. The tube is provided with a number of relatively small openings 2 in its wall, which makes possible the communication of the fluid from the container to the interior of the tube, so that the level of the fluid is the same in the tube as in the container. The upper limitation or roof of the container is designated by 3. On it there is a unit 4 rigidly mounted. This unit comprises a transmitter, not shown, for feeding a polarized microwave signal, in this case with $H_{11}$ mode, and a receiver for receiving reflected microwave signals, and an electronic unit for determining the reflect position of the reflected microwave signal.

The transmitter comprises a circular waveguide, designated by 5 in FIG. 1. A section of this waveguide 6, consists of the polarization means, and is turnable between two positions at 45° distance from each other. In this section there is mounted a plane plate 7 of a polymer material, diametrically filling out the section, with its plane parallel to the symmetry axis of the waveguide. The waveguide is surrounded by a protection tube 8. The waveguide 5 passes via a conical middle piece 9 over to the tube 1. In the lower portion of it there is a relatively thin metal pin 10 mounted diametrically perpendicular to the longitudinal direction of the tube 1. This metal pin 10 consists of a reactance which gives rise to a defined reflection of an emitted microwave signal, which is received by the receiver in the unit 4 and via the electronic unit gives a calibration of the gauging function. The unit 4 with the transmitter and the receiver is fixed in relation to the metal pin.

In FIG. 2 A the section 6 is shown by the waveguide with the plate 7, i.e. the polarization means used. The polarization of an incoming microwave signal is presented schematically in the FIGS 2 B and 2 C. $H_{11}$ mode is used, and the central vector of the E field above the plate 7 is designated by E. If the plate 7 is at right angles to this vector E, there is no effect on the E field, FIG. 2 B. If, on the other hand, as in FIG. 2 C, the plate is at 45° to the vector E, it will be turned 90°, to the direction $E_p$ under the plate. The explanation presents itself if E is split up into the components $E_1$ and $E_2$. Out of these, $E_2$ is directed parallelly to the plate and is phase-shifted 180°, while $E_1$ remains unchanged. $E_p$ is the resultant of $E_1$ and $E_3$ under the plate, as mentioned, turned 90° relative to E.

If now the microwave signal is emitted with the central vector of the E field perpendicular to the metal pin 10, only a relatively weak signal will be reflected to the receiver, while there is hardly any effect of the metal pin on the signal that is reflected away from the surface of the fluid if the metal pin is located near that surface. If, on the other hand, the central vector of the E field is emitted polarized 90° it will be reflected with maximum strength by the metal pin, and thereby makes a calibration gauging possible.

In FIG. 1, only one metal pin 10 is shown, but in practice several such pins are used, as mentioned, located at different levels. Only a metal pin that is located above the surface of the fluid gives rise to a reflected signal.

In FIG. 3, four alternative embodiments of the polarization means are shown in two columns, schematically in cross section. FIG. 3 $A_1$ is a waveguide section with oval cross section that can be turned 45° for polarization of an incoming microwave signal. FIGS. 3 $B_1$, $B_2$ show a metal pin 12 that does not fill a circular cross section of a waveguide, FIGS. 3 $C_1$, $C_2$ show metal plates in the form of rails 13 at the wall of a circular waveguide, and FIGS. 3 $D_1$, $D_2$ show a circular waveguide with diametrically insertable, plane metal plates 14.

Some different alternative embodiments of a reactance can be seen in FIG. 4. The embodiment with a relatively thin metal pin 10 is shown perspectively and in cross section in FIGS. 4 A, and 4 B, respectively.

A variant, FIG. 5A, B is formed as a pair of symmetrically, diametrically mounted pegs 5. One further proposed embodiment is a circumferential aperture 11 shown by FIGS. 6 A, B.

It should be noted, that the adjustment of the polarization means can be effected manually or through distant control completely independent of the operation conditions in the container that contains the fluid in question.

I claim:

1. A device for gauging the level of a fluid in a container, i.e. a fluent or granulate material, preferably a condensable gas under overpressure, comprising:
   vertical tube through which a number of relatively small openings in its wall so communicate with said fluid that its level in the tube is the same as in the container;
   transmitter for feeding a polarizable microwave signal through the said tube, said tube having a cross section dimensioned to admit passage of the microwave signal;
   an electronic unit arranged to determine the reflex position of the reflected microwave signal;
   characterized by
   polarization means (6, 7) arranged optionally to polarize the microwave signal emitted from the transmitter in a first and a second polarization plane, which form a metal angle, preferably 90°;
   at least one reflecting reactance (10) arranged in the tube (1) to give a substantially stronger reflex of the microwave signal in the fluid polarization plane than in the second.

2. A device according to claim 1, characterized in that the transmitter comprises a circular waveguide (5) for one-mode propagation, preferably $H_{11}$ mode.

3. A device according to claim 1, characterized in that the polarization means consists of a substantially plane plate (7) of a dielectric material such as a polymer, arranged with its plane substantially parallel to the symmetry axis of the waveguide, preferably crosswise filling out the diameter of the waveguide, the plate being arranged turntable about the symmetry axis of the waveguide optionally between two positions, preferably so that the planes of the plate in the two positions forms 45°.

4. A device according to claim 1, characterized in that the polarization means consists of at least one plane metal plate placed with its plane substantially parallel to the symmetry axis of the waveguide, not crosswise filling out the diameter of the waveguide, the metal plate being arranged turnable about the symmetry axis of the waveguide optionally between two positions, preferably so that the planes of the metal plate in the two positions form 45°.

5. A device according to claim 1, characterized in that the polarization means is a section of a waveguide (3 A), which is oval in cross section, the waveguide section being arranged turntable about its symmetry axis optionally between two positions, preferably so that the longitudinal symmetry planes of the waveguide section in the two positions form 45°.

6. A device according to claim 1, characterized in that the said reactance is formed of a relatively thin metal pin (10), arranged with its longitudinal direction perpendicular to the longitudinal axis of the tube (1), preferably extending diametrically through the tube (1).

7. A device according to claim 1, characterized in that the reactance is formed by an aperture (11) in the wall of the tube, preferably with its longitudinal direction perpendicular to the longitudinal axis of the tube (1).

* * * * *